(12) United States Patent
Barker

(10) Patent No.: US 8,683,595 B1
(45) Date of Patent: Mar. 25, 2014

(54) SYSTEMS AND METHODS FOR DETECTING POTENTIALLY MALICIOUS CONTENT WITHIN NEAR FIELD COMMUNICATION MESSAGES

(75) Inventor: Clifton Barker, Austin, TX (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/517,529

(22) Filed: Jun. 13, 2012

(51) Int. Cl.
*G06F 21/00* (2013.01)

(52) U.S. Cl.
USPC .......................................... 726/24; 380/270

(58) Field of Classification Search
None
See application file for complete search history.

(56) References Cited

U.S. PATENT DOCUMENTS

| | | | | |
|---|---|---|---|---|
| 7,640,361 | B1 * | 12/2009 | Green et al. | 709/246 |
| 8,014,720 | B2 * | 9/2011 | Lortz | 455/41.1 |
| 2009/0055642 | A1 * | 2/2009 | Myers et al. | 713/155 |
| 2012/0315846 | A1 * | 12/2012 | Gartner et al. | 455/41.1 |

OTHER PUBLICATIONS

Qu Bo Song; Systems and Methods for Detecting Near Field Communication Risks; U.S. Appl. No. 13/749,668, filed Jan. 24, 2013.

* cited by examiner

*Primary Examiner* — Gilberto Barron, Jr.
*Assistant Examiner* — Devin Almeida
(74) *Attorney, Agent, or Firm* — ALG Intellectual Property, LLC

(57) ABSTRACT

A computer-implemented method for detecting potentially malicious content within NFC messages may include identifying an NFC message received by a mobile device via wireless transmission from an NFC device located in proximity of the mobile device. The method may also include determining that the NFC message is formatted in a suspicious format type capable of importing potentially malicious content into the mobile device and then scanning the NFC message for potentially malicious content in response to the determination. The method may further include detecting at least one instance of potentially malicious content while scanning the NFC message. In addition, the method may include performing at least one security action on the mobile device in response to the detection of the instance of potentially malicious content within the NFC message. Various other methods, systems, and computer-readable media are also disclosed.

18 Claims, 7 Drawing Sheets

SYSTEMS AND METHODS FOR DETECTING POTENTIALLY MALICIOUS CONTENT WITHIN NEAR FIELD COMMUNICATION MESSAGES

BACKGROUND

In recent years, some mobile technology developers have developed Near Field Communication ("NFC") technologies that facilitate short-range communication between NFC-enabled mobile devices. For example, GOOGLE's NFC technology known as ANDROID BEAM may facilitate transferring NFC messages between certain ANDROID-based mobile phones while the backs of the phones are physically touching together. Unfortunately, while such NFC technologies may facilitate transferring NFC messages from one device to another, some traditional NFC-enabled devices may automatically launch the payload of received NFC messages even if the payload includes potentially malicious content.

What is needed, therefore, is a mechanism that efficiently and effectively detects potentially malicious content within the payload of NFC messages received on mobile devices before the mobile devices launch the message payload.

SUMMARY

As will be described in greater detail below, the instant disclosure generally relates to systems and methods for detecting potentially malicious content within NFC messages to prevent NFC-enabled devices from automatically launching the potentially malicious content upon receiving such NFC messages. In one example, a computer-implemented method for detecting potentially malicious content with NFC messages may include (1) identifying an NFC message received by a mobile device via wireless transmission from an NFC device (such as another mobile device capable of transmitting the NFC message, an unpowered NFC chip, or a standalone NFC transmitter) located in proximity of the mobile device, (2) determining that the NFC message is formatted in a suspicious format type capable of importing potentially malicious content into the mobile device, (3) scanning the NFC message for potentially malicious content in response to determining that the NFC message is formatted in a suspicious format type, (4) detecting at least one instance of potentially malicious content within the NFC message while scanning the NFC message, and then (5) performing at least one security action on the mobile device in response to detecting the instance of potentially malicious content within the NFC message.

In some examples, the method may also include identifying a format-type identifier that specifies a format type of the NFC message. In such examples, the method may further include comparing the format-type identifier with a list of suspicious format types capable of importing potentially malicious content into the mobile device. In addition, the method may include determining that the format-type identifier matches at least one suspicious format type identified in the list based at least in part on the comparison. Examples of suspicious format types include, without limitation, any Multipurpose Internet Mail Extensions ("MIME") types that represent an octet stream capable of being executed by the mobile device or a link capable of facilitating access to a remote storage device (such as a URL that references a phishing web site).

In some examples, the method may also include identifying a computing payload within the NFC message. In such examples, the method may further include applying at least one malware-detection technique to the computing payload within the NFC message to determine whether the computing payload comprises malware. In addition, the method may include applying at least one phishing-detection technique to the computing payload within the NFC message to determine whether the computing payload comprises a link to a phishing application.

In some examples, the method may also include detecting malware within the NFC message. Additionally or alternatively, the method may include detecting a link within the NFC message to a phishing application.

In some examples, the method may also include preventing the mobile device from executing the instance of potentially malicious content. Additionally or alternatively, the method may include providing a warning message associated with the instance of potentially malicious content for display on the mobile device to warn a user of the mobile device about the potentially malicious content.

In some examples, the method may also include describing the instance of potentially malicious content within the warning message. Additionally or alternatively, the method may include querying the user about whether to execute the instance of potentially malicious content on the mobile device.

In some examples, the method may also include receiving user input indicating that the user of the mobile device wishes to execute the instance of potentially malicious content on the mobile device. In such examples, the method may further include directing the mobile device to execute the instance of potentially malicious content in response to receiving the user input.

In one embodiment, a system for implementing the above-described method may include (1) an identification module programmed to identify an NFC message received by a mobile device via wireless transmission from an NFC device located in proximity of the mobile device, (2) an analysis module programmed to (a) determine that the NFC message is formatted in a suspicious format type capable of importing potentially malicious content into the mobile device, (b) scan the NFC message for potentially malicious content in response to determining that the NFC message is formatted in the suspicious format type, and (c) detect at least one instance of potentially malicious content within the NFC message while scanning the NFC message, and (3) a security module programmed to perform at least one security action on the mobile device in response to the detection of the instance of potentially malicious content within the NFC message.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify an NFC message received by a mobile device via wireless transmission from an NFC device located in proximity of the mobile device, (2) determine that the NFC message is formatted in a suspicious format type capable of importing potentially malicious content into the mobile device, (3) scan the NFC message for potentially malicious content in response to determining that the NFC message is formatted in the suspicious format type, (4) detect at least one instance of potentially malicious content within the NFC message while scanning the NFC message, and then (5) perform at least one security action on the mobile device in response to detecting the instance of potentially malicious content within the NFC message.

As will be explained in greater detail below, by scanning NFC messages received on mobile devices before the mobile devices launch the message payload, the various systems and methods described herein may detect potentially malicious content within the NFC messages and prevent the potentially malicious content from harming the mobile devices.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
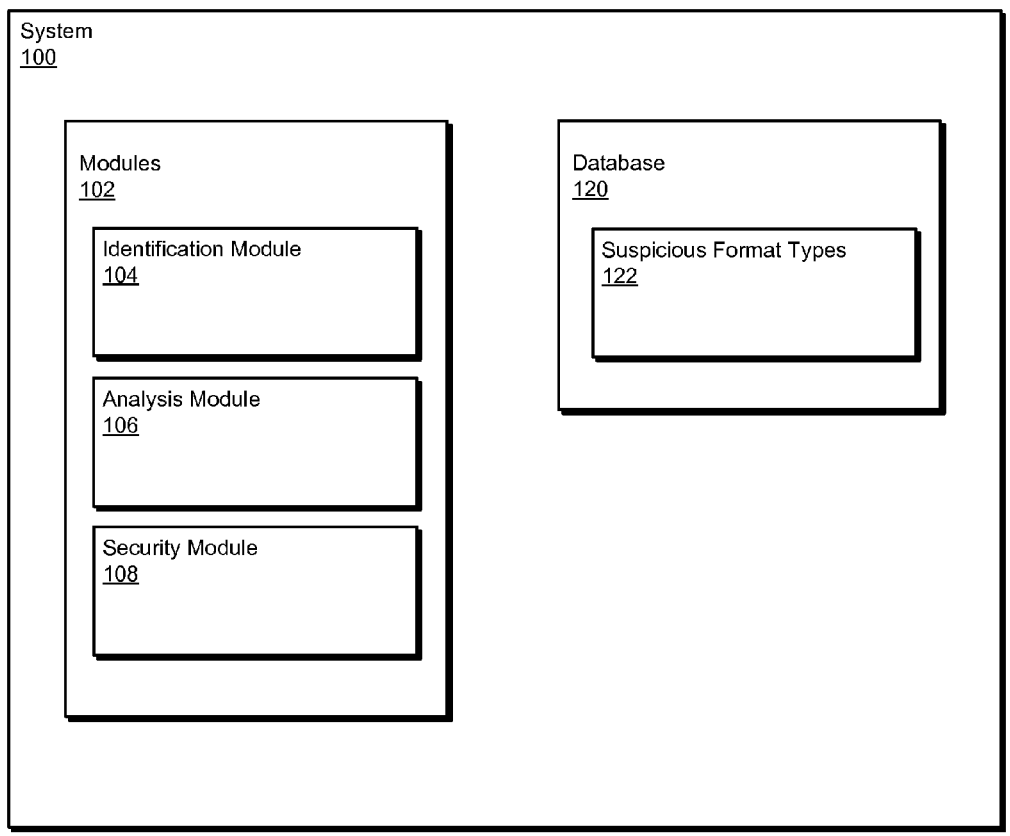
FIG. 1 is a block diagram of an exemplary system for detecting potentially malicious content within NFC messages.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
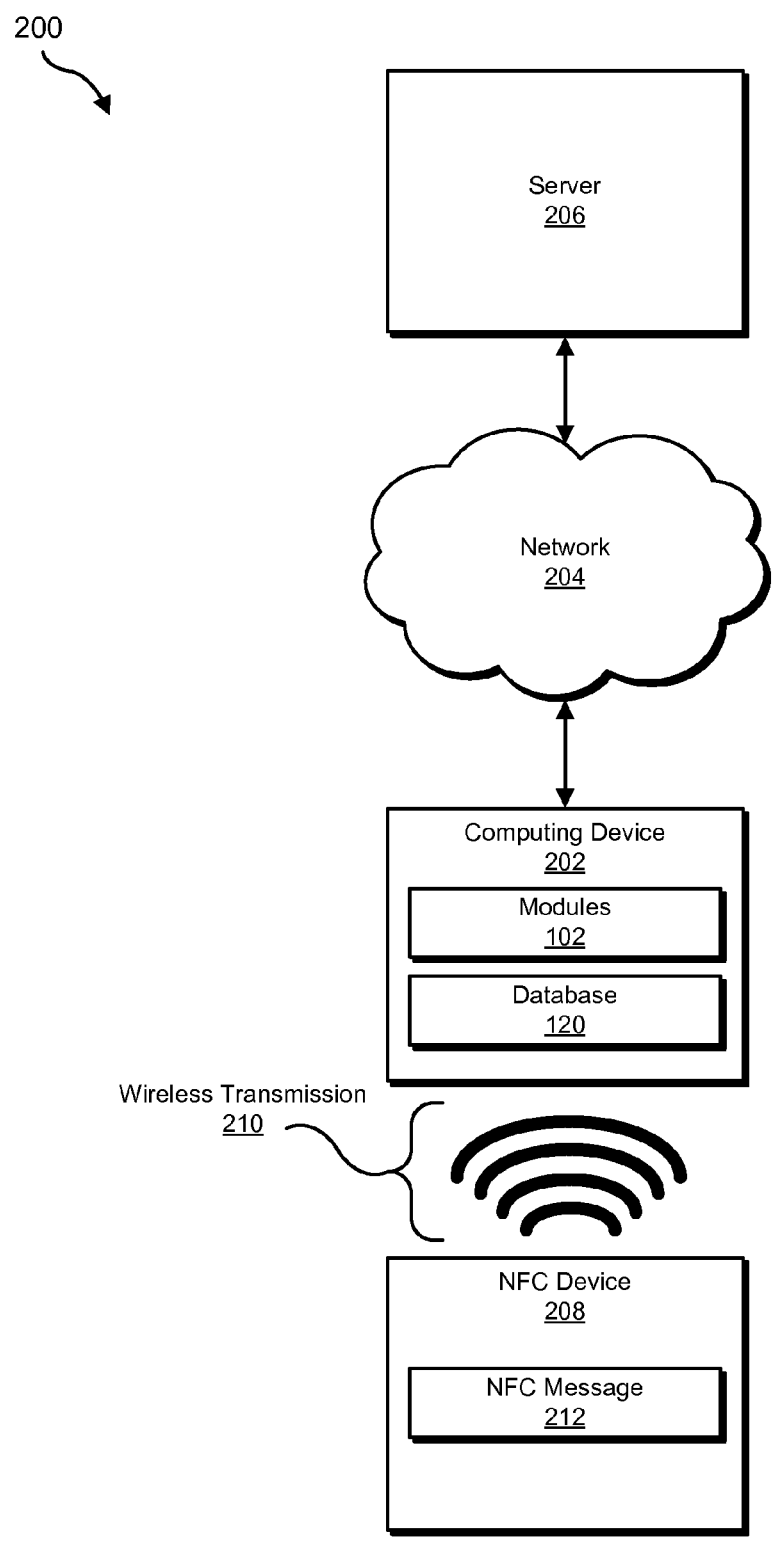
FIG. 2 is a block diagram of an exemplary system for detecting potentially malicious content within NFC messages.

The following will provide, with reference to FIGS. 1-2, detailed descriptions of exemplary systems for detecting potentially malicious content within NFC messages. Detailed descriptions of corresponding computer-implemented methods will also be provided in connection with FIG. 3, and detailed descriptions of an exemplary NFC message, exemplary suspicious format types, and an exemplary warning message will be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for detecting potentially malicious content within NFC messages. As illustrated in this figure, exemplary system 100 may include one or more modules 102 for performing one or more tasks. For example, and as will be explained in greater detail below, exemplary system 100 may include an identification module 104 programmed to identify an NFC message received by a mobile device via wireless transmission from an NFC device located in proximity of the mobile device. Exemplary system 100 may also include an analysis module 106 programmed to (1) determine that the NFC message is formatted in a suspicious format type capable of importing potentially malicious content into the mobile device, (2) scan the NFC message for potentially malicious content in response to determining that the NFC message is formatted in the suspicious format type, and (3) detect at least one instance of potentially malicious content within the NFC message while scanning the NFC message.

In addition, and as will be described in greater detail below, exemplary system 100 may also include a security module 108 programmed to perform at least one security action on the mobile device in response to the detection of the instance of potentially malicious content within the NFC message. Although illustrated as separate elements, one or more of modules 102 in FIG. 1 may represent portions of a single module or application (such as a bundled NFC application integrated into a mobile device).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, server 206, and/or NFC device 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store suspicious format types 122 used to identify format types of NFC messages capable of importing potentially malicious content into mobile devices. In addition, although not illustrated in FIG. 1, database 120 may include various additional information used to detect and/or protect against potentially malicious content within NFC messages.

Database 120 may represent portions of a single database or computing device or a plurality of databases or computing devices. For example, database 120 may represent a portion of computing device 202, server 206, and/or NFC device 208 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 and/or NFC device 208 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. System 200 may also include an NFC device 208 capable of providing an NFC message 212 to computing device 202 via a wireless transmission 210.

In one embodiment, one or more of modules 102 from FIG. 1 may, when executed by at least one processor of computing device 202, enable computing device 202 to detect potentially malicious content within NFC messages. For example, and as will be described in greater detail below, one or more of modules 102 may cause computing device 202 to (1) identify NFC message 212 received by computing device 202 via wireless transmission 210 from NFC device 208 located in proximity of computing device 202, (2) determine that NFC message 212 is formatted in a suspicious format type capable of importing potentially malicious content into computing device 202, (3) scan NFC message 212 for potentially malicious content in response to determining that NFC message 212 is formatted in the suspicious format type, (4) detect at least one instance of potentially malicious content within NFC message 212 while scanning NFC message 212, and then (5) perform at least one security action on computing device 202 in response to detecting the instance of potentially malicious content within NFC message 212.

Computing device 202 generally represents any type or form of computing device capable of reading computer-executable instructions. Examples of computing device 202 include, without limitation, laptops, tablets, desktops, servers, mobile devices (such as NFC-enabled mobile devices), cellular phones (such as ANDROID-based mobile phones that include GOOGLE'S ANDROID BEAM technology), personal digital assistants (PDAs), multimedia players, embedded systems, combinations of one or more of the same, exemplary computing system 610 in FIG. 6, or any other suitable computing device.

NFC device 208 generally represents any type or form of device capable of wirelessly transmitting or otherwise providing NFC messages to computing devices. Examples of NFC device 208 include, without limitation, computing devices (e.g., mobile devices) capable of transmitting NFC messages, unpowered NFC chips, NFC-based smart posters, standalone NFC transmitters, NFC transceivers, combinations of one or more of the same, and/or any other suitable NFC devices.

Server 206 generally represents any type or form of computing device capable of facilitating access to information used to determine whether NFC messages include potentially malicious content. For example, server 206 may host a web application (such as a phishing application) referenced by a URL included in an NFC message. Examples of server 206 include, without limitation, application servers, web servers, and database servers configured to run certain software applications and/or provide various web and/or database services.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
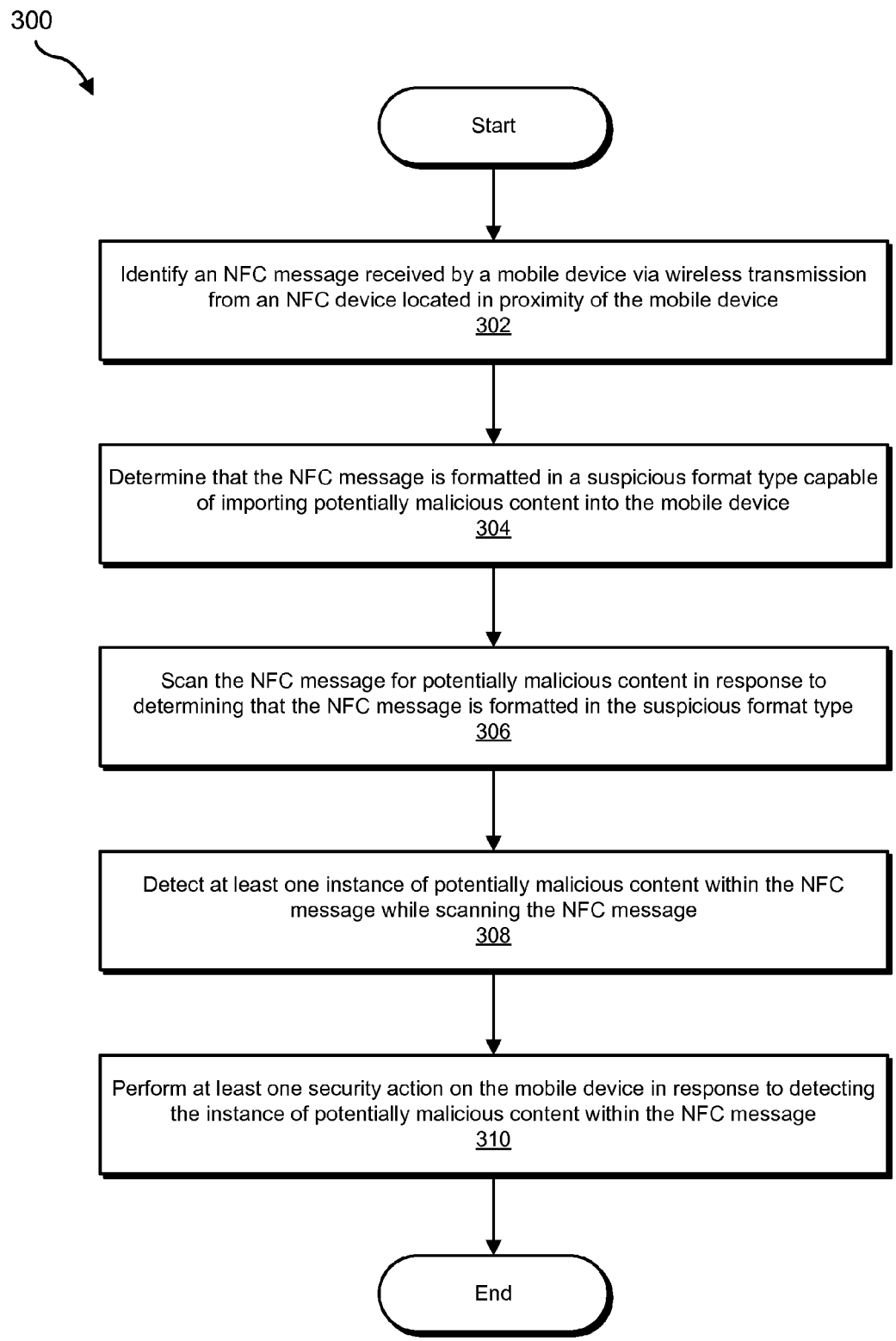
FIG. 3 is a flow diagram of an exemplary method for detecting potentially malicious content within NFC messages.

FIG. 3 is a flow diagram of an exemplary computer-implemented method 300 for detecting potentially malicious content within NFC messages. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated at step 302 in FIG. 3, the various systems described herein may identify an NFC message received by a mobile device via wireless transmission from an NFC device located in proximity of the mobile device. For example, identification module 104 may, as part of computing device 202, identify NFC message 212 received by computing device 202 via wireless transmission 210 from NFC device 208. In this example, NFC device 208 may have facilitated wireless transmission 210 while computing device 202 and NFC device 208 were located in proximity of one another.

The term "NFC," as used herein generally refers to any short-range communication technology (such as a radio frequency identification technology) capable of operating in the 13.56 MHz frequency band. Such NFC technology may use one or more of the ISO/IEC 1800-3, ISO/IEC 14443, and ISO/IEC 18092 standards and communicate at a bit rate ranging from 106 kbit/s to 424 kbit/s. In addition, such NFC technology may facilitate communication between NFC-enabled devices only while the NFC-enabled devices are located within a short distance of one another (e.g., within approximately 4 centimeters of one another).

The systems described herein may perform step 302 in a variety of ways. In one example, identification module 104 may identify NFC message 212 immediately upon receipt of NFC message 212 on computing device 202. For example, identification module 104 may monitor activity on the NFC hardware that facilitates receipt of NFC messages on computing device 202. In this example, identification module 104 may detect activity on the NFC hardware and then determine that this activity resulted from receiving NFC message 212 on computing device 202.

In one example, identification module 104 may represent part of a bundled NFC application that interfaces with the NFC hardware on computing device 202. In this example, identification module 104 may intercept NFC message 212 as the bundled NFC application receives NFC message 212 via the NFC hardware on computing device 202. Upon intercepting NFC message 212, identification module 104 may identify NFC message 212.

In another example, computing device 202 may notify identification module 104 upon receiving NFC message 212. For example, upon receiving NFC message 212 on computing device 202, an NFC application that interfaces with the NFC hardware may notify identification module 104 that NFC message 212 has been received. In this example, identification module 104 may then intercept NFC message 212 in response to this notification from the NFC application.

In some examples, a user of NFC device 208 may initiate transmission of NFC message 212 to computing device 202. For example, the user of NFC device 208 may physically bring NFC device 208 within the operating range of the NFC hardware on computing device 202. In one example, upon bringing NFC device 208 within this operating range, the user of NFC device 208 may initiate transmission of NFC message 212 by entering user input (e.g., by pressing a software button) configured to initiate transmission of NFC message 212 to computing device 202. In another example, the user of NFC device 208 may initiate transmission of NFC message 212 by simply causing NFC device 208 to physically touch computing device 202.

As illustrated at step 304 in FIG. 3, the various systems described herein may determine that the NFC message is formatted in a suspicious format type capable of importing potentially malicious content into the mobile device. For example, analysis module 106 may, as part of computing device 202, determine that NFC message 212 is formatted in a suspicious format type capable of importing potentially malicious content into computing device 202. Examples of suspicious format types include, without limitation, any MIME types, Internet media types, content types, or other suspicious format types that represent an octet stream (such as an ".apk" file, an ".exe" file, an ".ipa" file, or a ".cab" file) capable of being executed by a mobile device or a link capable of facilitating access to a remote storage device (such as a URL that references a phishing website).

Figure 4:
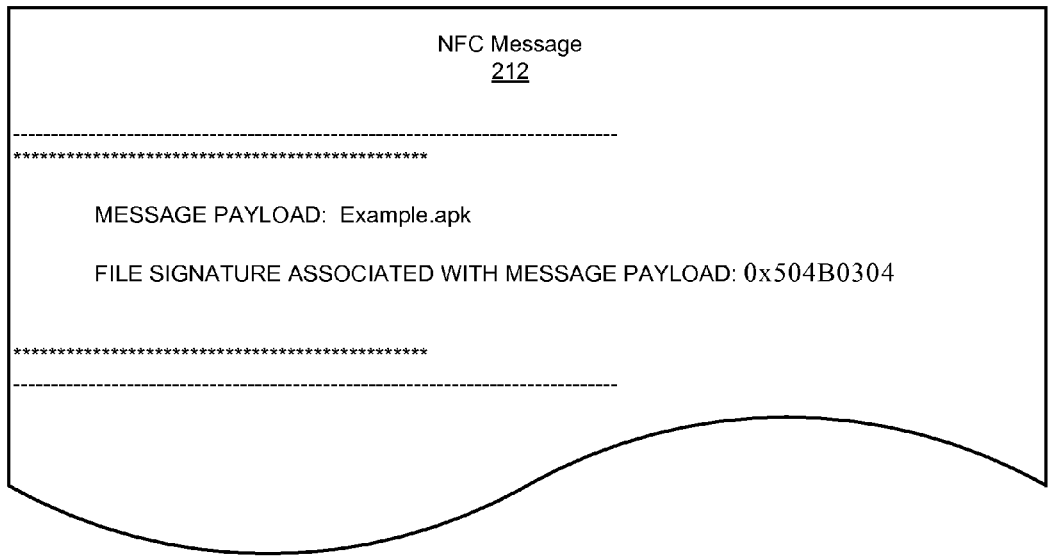
FIG. 4 is an illustration of an exemplary NFC message and exemplary suspicious format types.
Figure 4:
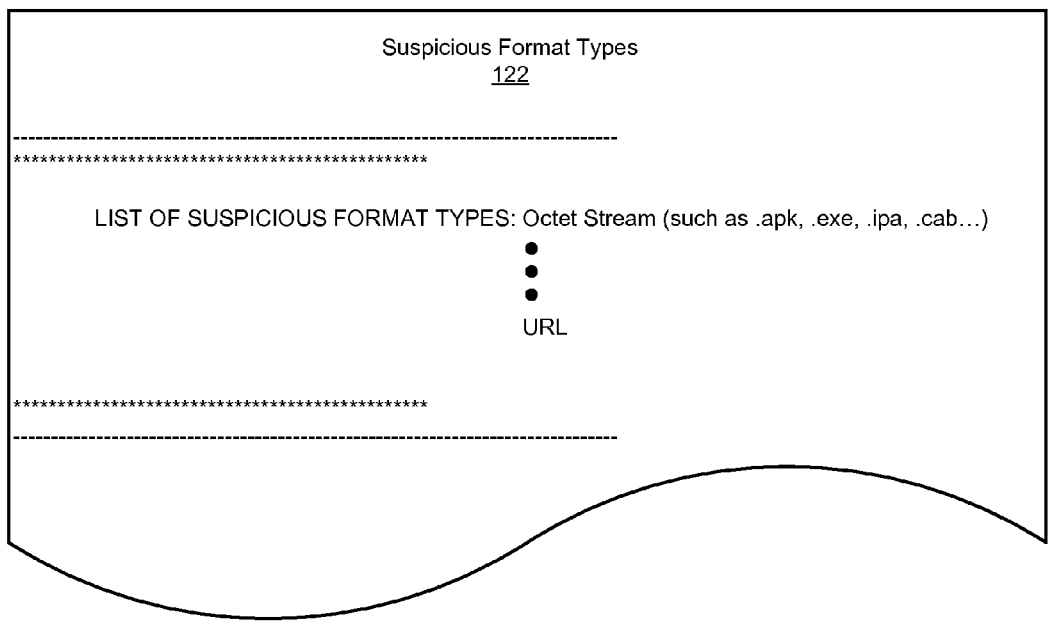

The systems described herein may perform step 306 in a variety of ways. In some examples, analysis module 106 may identify a format-type identifier that specifies a format type of NFC message 212. In one example, analysis module 106 may identify a file extension associated with NFC message 212. For example, as illustrated in FIG. 4, NFC message 212 may include a message payload (in this example, "Example.apk"). In this example, analysis module 106 may analyze the payload of NFC message 212 and then determine, based at least in part on this analysis, that ".apk" represents the file extension associated with the message payload. This file extension may indicate that the payload of NFC message 212 is formatted as an octet stream.

In another example, analysis module 106 may identify a file signature (sometimes referred to as a "magic number") associated with NFC message 212. For example, as illustrated in FIG. 4, NFC message 212 may include a file signature within the message payload (in this example, "0x504B0304"). In this example, analysis module 106 may analyze the payload of NFC message 212 (in a process sometimes referred to as a "content sniffing") and then determine, based at least in part on this analysis, that "0x504B0304" represents the file signature associated with the message payload.

This file signature may indicate that the payload of NFC message 212 is formatted as an octet stream. For example, the "0x504B0304" file signature may indicate that NFC message 212 includes an executable ".apk" file. As such, analysis module 106 may determine, based at least in part on the "0x504B0304" file signature, that the payload of NFC message 212 includes an executable ".apk" file.

In a further example, analysis module 106 may identify a URL associated with an NFC message. For example, although not illustrated in FIG. 4, an NFC message may include a URL (in this example, "http://example.com") that references an Internet resource (such as a website). In this example, analysis module 106 may analyze the payload of the NFC message and then determine, based at least in part on this analysis, that "http://example.com" represents a URL. This URL included in the NFC message may indicate that the message payload is formatted as a URL.

In some examples, upon identifying the format-type identifier, analysis module 106 may compare the format-type identifier with a list of suspicious format types capable of importing potentially malicious content into the mobile device. For example, analysis module 106 may retrieve suspicious format types 122 from database 120 on computing device 202. As illustrated in FIG. 4, suspicious format types 122 may include a list of suspicious format types capable of importing potentially malicious content into computing device 202 (in this example, "Octet Stream (such as .apk, .exe, .ipk, .cab . . . )" and "URL").

In some examples, analysis module 106 may determine, based at least in part on the comparison, that the format-type identifier matches at least one suspicious format type identified in the list. In one example, analysis module 106 may search for the ".apk" identifier that specifies the format type of NFC message 212 within the list identified in suspicious format types 122. In this example, upon performing the search, analysis module 106 may locate the ".apk" identifier within the list of exemplary octet streams identified in suspicious format types 122. Analysis module 106 may then determine that NFC message 212 is formatted in a suspicious format type since the ".apk" identifier that specifies the format type of NFC message 212 matches an exemplary octet stream identified in suspicious format types 122.

In another example, analysis module 106 may search for a URL identifier that specifies the format type of an NFC message within the list identified in suspicious format types 122. In this example, upon performing the search, analysis module 106 may locate the URL identifier within the list identified in suspicious format types 122. Analysis module 106 may then determine that the NFC message is formatted in a suspicious format type since the URL identifier that specifies the format type of the NFC message is included in the list identified in suspicious format types 122.

As illustrated at step 306 in FIG. 3, the various systems described herein may scan the NFC message for potentially malicious content in response to the determination that the NFC message is formatted in the suspicious format type. For example, analysis module 106 may, as part of computing device 202, scan NFC message 212 for potentially malicious content in response to the determination that NFC message 212 is formatted in the suspicious format type. Examples of potentially malicious content include, without limitation, malware, computer viruses, computer worms, Trojan horses, spyware, adware, unsolicited bots, links to phishing applications (such as URLs to phishing websites) and/or any other potentially malicious content.

The systems described herein may perform step 306 in a variety of ways. In one example, analysis module 106 may apply at least one malware-detection technique to the payload of NFC message 212 to determine whether the message payload includes malware. For example, analysis module 106 may perform the malware-detection technique on the "Example.apk" file included in NFC message 212. Examples of malware-detection techniques include, without limitation, reputation-based detection techniques, heuristic-based detection techniques, signature-based detection techniques, deterministic detection techniques, and/or any other suitable malware-detection techniques.

In another example, analysis module 106 may apply at least one phishing-detection technique to the payload of an NFC message to determine whether the message payload includes a link to a phishing application. For example, analysis module 106 may perform the phishing-detection technique on the "http://example.com" URL included in an NFC message. Examples of phishing-detection techniques include, without limitation, machine-learning detection techniques based on logistic regression, classification and regression trees, random forests, neural networks, support vector machines, Bayesian additive regression trees, and/or any other suitable phishing-detection techniques.

As illustrated at step 308 in FIG. 3, the various systems described herein may detect at least one instance of potentially malicious content within the NFC message. For example, analysis module 106 may, as part of computing device 202, detect at least one instance of potentially malicious content within NFC message 212. In this example, analysis module 106 may detect this instance of potentially malicious content while scanning NFC message 212.

The systems described herein may perform step 308 in a variety of ways. In one example, while scanning NFC message 212, analysis module 106 may detect malware within NFC message 212. For example, upon applying the malware-detection technique to NFC message 212, analysis module 106 may determine that the "Example.apk" file includes malware. In this example, analysis module 106 may identify the "Example.apk" file as the malicious content included in NFC message 212.

In another example, while scanning an NFC message, analysis module 106 may detect a link within the NFC message to a phishing application. For example, upon applying a phishing-detection technique to an NFC message, analysis module 106 may determine that the "http://example.com" URL included in an NFC message references a phishing website. In this example, analysis module 106 may identify the "http://example.com" URL as the malicious content included in the NFC message.

As illustrated at step 310 in FIG. 3, the various systems described herein may perform at least one security action on the mobile device in response to the detection of the potentially malicious content within the NFC message. For example, security module 108 may, as part of computing device 202, perform at least one security action on computing device 202. In this example, security module 108 may perform the security action in response to the detection of the potentially malicious content within NFC message 212.

The systems described herein may perform step 310 in a variety of ways. In some examples, security module 108 may prevent computing device 202 from executing or otherwise launching the instance of potentially malicious content. For example, security module 108 may prevent computing device 202 from executing the "Example.apk" file included in NFC message 212. In another example, security module 108 may prevent computing device 202 from accessing a phishing website referenced by the "http://example.com" URL included in an NFC message.

Figure 5:
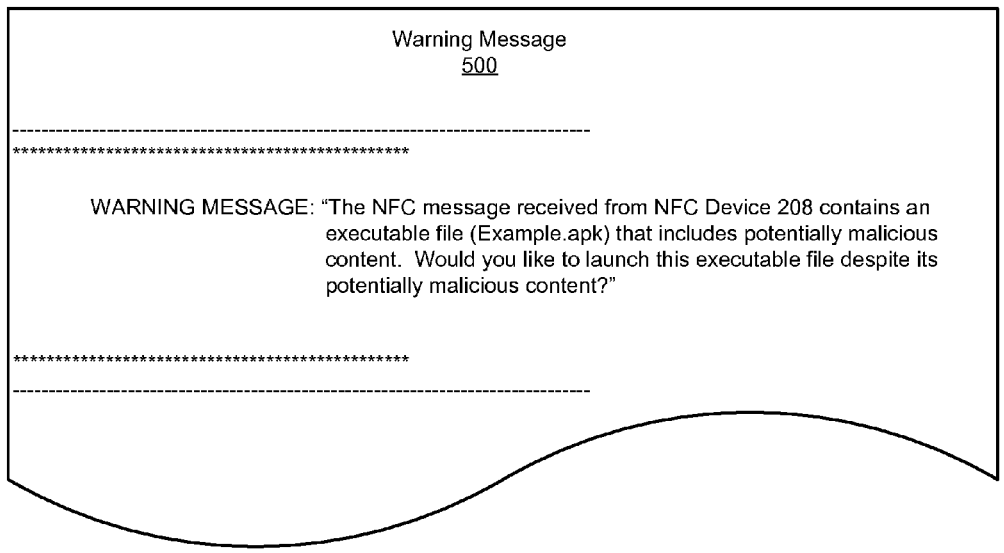
FIG. 5 is an illustration of an exemplary warning message.

In some examples, security module 108 may provide a warning message 500 for display on computing device 202. In one example, security module 108 may describe the instance of potentially malicious content within warning message 500. For example, as illustrated in FIG. 5, warning message 500 may warn, "The NFC message received from NFC Device 208 contains an executable file (Example.apk) that includes potentially malicious content." In this example, security module 108 may direct computing device 202 to display warning message 500 to a user of computing device 202.

In some examples, security module 108 may query the user of computing device 202 about whether to execute or otherwise launch the instance of potentially malicious content. In one example, security module 108 may include this query in warning message 500 (or, alternatively, in an additional message provided for display on computing device 202). For example, as illustrated in FIG. 5, warning message 500 may query, "Would you like to launch this executable file despite its potentially malicious content?"

In some examples, after querying the user, security module 108 may receive user input indicating whether the user wishes to execute or otherwise launch the instance of potentially malicious content on computing device 202. In one example, the user input may indicate that the user does not wish to execute the "Example.apk" file. In this example, upon receiving the user input, security module 108 may prevent computing device 202 from executing the "Example.apk" file.

In another example, the user input may indicate that the user wishes to execute the "Example.apk" file despite the file's potentially malicious content. In this example, upon receiving the user input, security module 108 may direct computing device 202 to execute the "Example.apk" file despite the file's potentially malicious content.

As explained above, by scanning NFC messages received on mobile devices before the mobile devices launch the message payload, the various systems and methods described herein may detect potentially malicious content within the NFC messages and prevent the potentially malicious content from harming the mobile devices.

Figure 6:
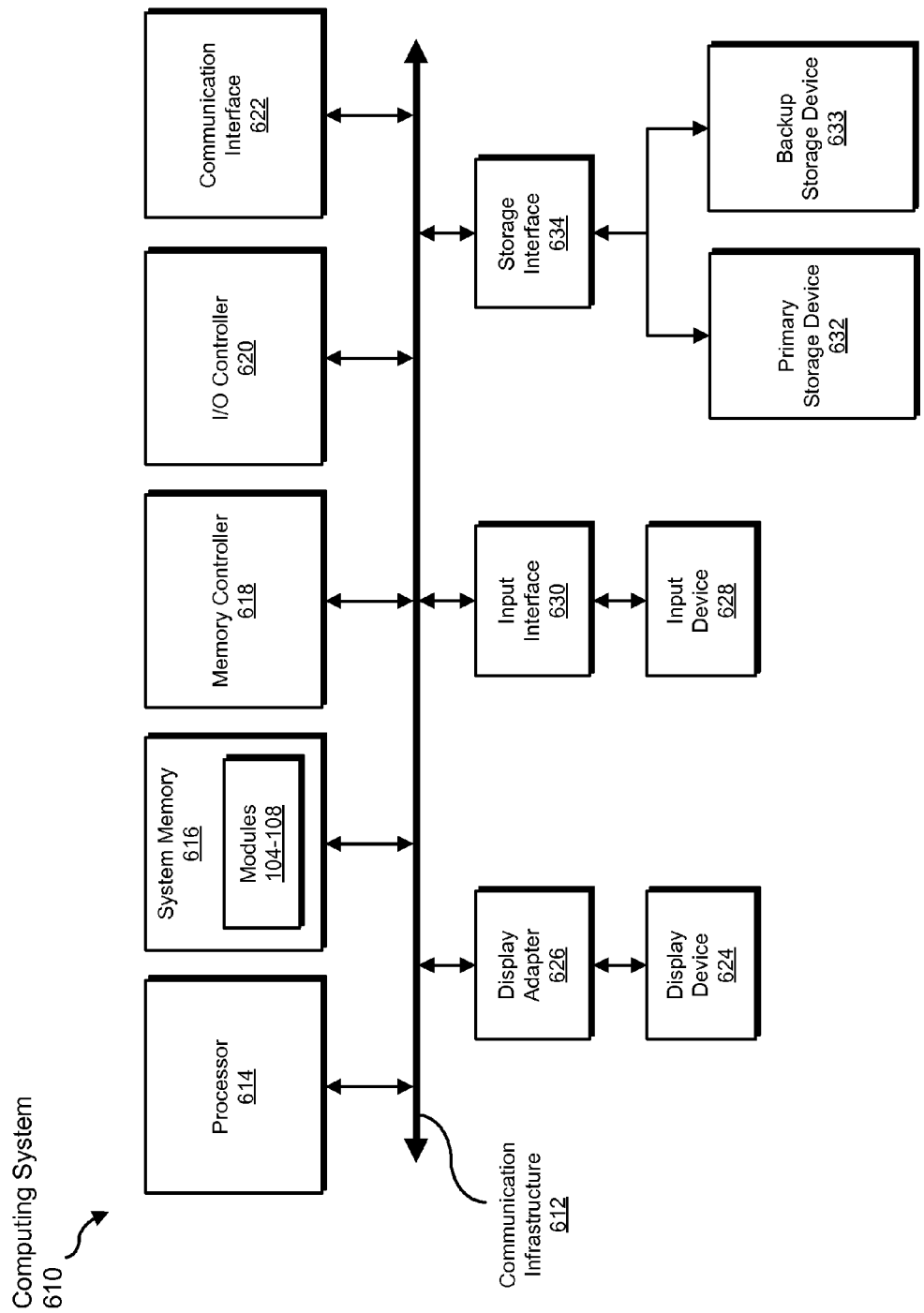
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, determining, scanning, detecting, performing, comparing, applying, preventing, providing, describing, querying, receiving, and directing steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
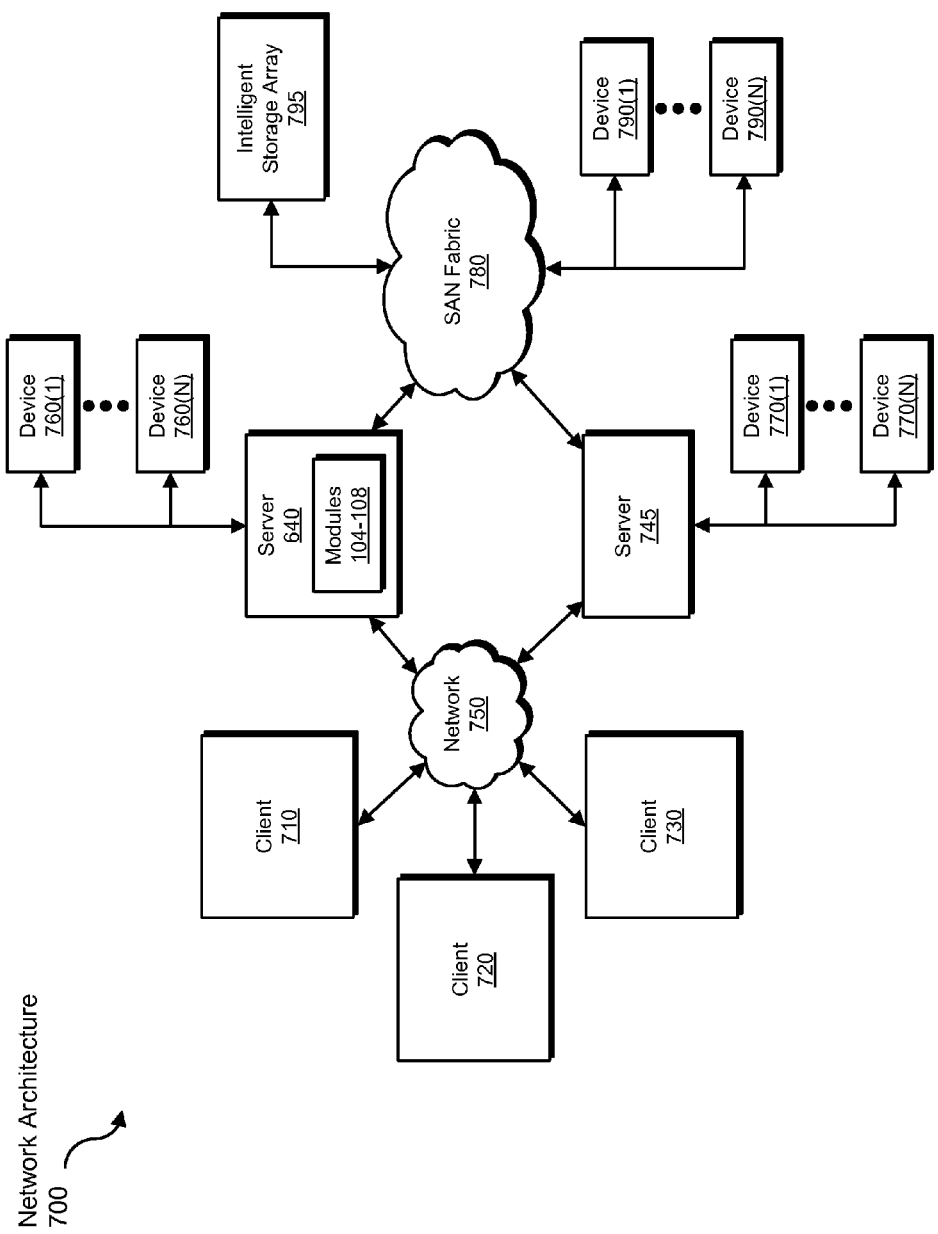
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, determining, scanning, detecting, performing, comparing, applying, preventing, providing, describing, querying, receiving, and directing steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting potentially malicious content within Near Field Communication messages.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a characteristic or property of one or more physical devices (such as computing device 202 and/or server 206 in FIG. 2) by detecting potentially malicious content within NFC messages and/or performing security actions on the physical devices.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting potentially malicious content within Near Field Communication messages, at least a portion of the method being performed by a computing device comprising at least one processor, the method comprising:
   identifying an NFC message received by a mobile device via NFC transmission from an NFC device located in proximity of the mobile device;
   determining that the NFC message is formatted in a suspicious format type capable of importing potentially malicious content into the mobile device by:
      identifying a format-type identifier that specifies a format type of the NFC message;
      comparing the format-type identifier with a list of suspicious format types capable of importing potentially malicious content into the mobile device;
      determining, based at least in part on the comparison, that the format-type identifier matches at least one suspicious format type identified in the list;
   in response to determining that the NFC message is formatted in the suspicious format type, scanning the NFC message for potentially malicious content;
   while scanning the NFC message, detecting at least one instance of potentially malicious content within the NFC message;
   in response to detecting the instance of potentially malicious content within the NFC message, performing at least one security action on the mobile device.

2. The method of claim 1, wherein the suspicious format type comprises a MIME type that represents at least one of:
   an octet stream capable of being executed by the mobile device;
   a link to a remote storage device.

3. The method of claim 1, wherein scanning the NFC message for potentially malicious content comprises:
   identifying a computing payload within the NFC message;
   applying at least one malware-detection technique to the computing payload within the NFC message to determine whether the computing payload comprises malware.

4. The method of claim 1, wherein scanning the NFC message for potentially malicious content comprises:
   identifying a computing payload within the NFC message;
   applying at least one phishing-detection technique to the computing payload within the NFC message to determine whether the computing payload comprises a link to a phishing application.

5. The method of claim 1, wherein detecting the instance of potentially malicious content within the NFC message comprises at least one of:
   detecting malware within the NFC message;
   detecting a link within the NFC message to a phishing application.

6. The method of claim 1, wherein the security action performed on the mobile device comprises at least one of:
   preventing the mobile device from executing the instance of potentially malicious content;
   providing a warning message associated with the instance of potentially malicious content for display on the mobile device to warn a user of the mobile device about the potentially malicious content.

7. The method of claim 6, wherein providing the warning message for display on the mobile device comprises at least one of:
   describing the instance of potentially malicious content within the warning message;
   querying the user about whether to execute the instance of potentially malicious content on the mobile device.

8. The method of claim 7, further comprising:
   after querying the user about whether to execute the instance of potentially malicious content on the mobile device, receiving user input indicating that the user of the mobile device wishes to execute the instance of potentially malicious content on the mobile device;
   in response to receiving the user input, directing the mobile device to execute the instance of potentially malicious content.

9. The method of claim 1, wherein the NFC device comprises at least one of:
   another mobile device capable of transmitting the NFC message;
   an unpowered NFC chip;
   a standalone NFC transmitter.

10. A system for detecting potentially malicious content within NFC messages, the system comprising:
    an identification module programmed to identify an NFC message received by a mobile device via NFC transmission from an NFC device located relatively proximate to the mobile device;
    an analysis module programmed to:
       determine that the NFC message is formatted in a suspicious format type capable of importing potentially malicious content into the mobile device by:
          identifying a format-type identifier that specifies a format type of the NFC message;
          comparing the format-type identifier with a list of suspicious format types capable of importing potentially malicious content into the mobile device;
          determining, based at least in part on the comparison, that the format-type identifier matches at least one suspicious format type identified in the list;
       scan the NFC message for potentially malicious content in response to determining that the NFC message is formatted in the suspicious format type;
       detect at least one instance of potentially malicious content within the NFC message while scanning the NFC message;
    a security module programmed to perform at least one security action on the mobile device in response to detection of the instance of potentially malicious content within the NFC message;

at least one processor configured to execute the identification module, the analysis module, and the security module.

11. The system of claim 10, wherein the suspicious format type comprises a MIME type that represents at least one of:
   an octet stream capable of being executed by the mobile device;
   a link to a remote storage device.

12. The system of claim 10, wherein the analysis module is programmed to:
   identify a computing payload within the NFC message;
   apply at least one malware-detection technique to the computing payload within the NFC message to determine whether the computing payload comprises malware.

13. The system of claim 10, wherein the analysis module is programmed to:
   identify a computing payload within the NFC message;
   apply at least one phishing-detection technique to the computing payload within the NFC message to determine whether the computing payload comprises a link to a phishing application.

14. The system of claim 10, wherein the analysis module is programmed to at least one of:
   detect malware within the NFC message;
   detect a link within the NFC message to a phishing application.

15. The system of claim 10, wherein the security action performed on the mobile device comprises at least one of:
   preventing the mobile device from executing the instance of potentially malicious content;
   providing a warning message associated with the instance of potentially malicious content for display on the mobile device to facilitate visualization of the warning message by a user of the mobile device.

16. The system of claim 15, wherein the security module is programmed to at least one of:
   describe the instance of potentially malicious content within the warning message;
   query the user about whether to execute the instance of potentially malicious content on the mobile device.

17. The system of claim 10, wherein the security module is programmed to:
   receive user input indicating that the user of the mobile device wishes to execute the instance of potentially malicious content on the mobile device;
   in response to receiving the user input, directing the mobile device to execute the instance of potentially malicious content.

18. A non-transitory computer-readable-storage medium comprising one or more computer-executable instructions that, when executed by at least one processor of a computing device, cause the computing device to:
   identify an NFC message received by a mobile device via NFC transmission from an NFC device located relatively proximate to the mobile device;
   determine that the NFC message is formatted in a suspicious format type capable of importing potentially malicious content into the mobile device by:
      identifying a format-type identifier that specifies a format type of the NFC message;
      comparing the format-type identifier with a list of suspicious format types capable of importing potentially malicious content into the mobile device;
      determining, based at least in part on the comparison, that the format-type identifier matches at least one suspicious format type identified in the list;
   scan the NFC message for potentially malicious content in response to determining that the NFC message is formatted in the suspicious format type;
   detect at least one instance of potentially malicious content within the NFC message while scanning the NFC message;
   perform at least one security action on the mobile device in response to detecting the instance of potentially malicious content within the NFC message.

* * * * *